United States Patent
Soane et al.

(10) Patent No.: US 6,599,327 B2
(45) Date of Patent: Jul. 29, 2003

(54) MODIFIED TEXTILES AND OTHER MATERIALS AND METHODS FOR THEIR PREPARATION

(75) Inventors: David S. Soane, Piedmont, CA (US); David A. Offord, Castro Valley, CA (US)

(73) Assignee: Nano-Tex, LLC, Emeryville, CA (US)

( * ) Notice: Subject to any disclaimer, the term of this patent is extended or adjusted under 35 U.S.C. 154(b) by 0 days.

(21) Appl. No.: 10/190,188

(22) Filed: Jul. 5, 2002

(65) Prior Publication Data

US 2002/0189024 A1 Dec. 19, 2002

Related U.S. Application Data

(62) Division of application No. 09/586,185, filed on Jun. 1, 2000, now Pat. No. 6,485,530, which is a division of application No. 09/274,751, filed on Mar. 23, 1999, now abandoned.

(60) Provisional application No. 60/080,185, filed on Mar. 24, 1998, provisional application No. 60/093,820, filed on Jul. 23, 1998, provisional application No. 60/093,911, filed on Jul. 23, 1998, provisional application No. 60/105,890, filed on Oct. 27, 1998, and provisional application No. 60/117,641, filed on Jan. 28, 1999.

(51) Int. Cl.[7] .......................................... D06M 13/322
(52) U.S. Cl. .................................. 8/185; 8/186
(58) Field of Search ............................ 8/185, 186

(56) References Cited

U.S. PATENT DOCUMENTS

| | | | |
|---|---|---|---|
| 3,276,885 A | 10/1966 | Gandon et al. | 106/205 |
| 3,674,667 A | 7/1972 | Manion et al. | 204/165 |
| 3,691,153 A | 9/1972 | Vemuri | 260/209 R |
| 3,856,558 A | 12/1974 | Robbart | 117/106 R |

(List continued on next page.)

FOREIGN PATENT DOCUMENTS

| | | |
|---|---|---|
| DE | 1 238 432 | 4/1976 |
| DE | 196 54 739 | 7/1998 |
| EP | 0 281 655 | 9/1988 |

(List continued on next page.)

OTHER PUBLICATIONS

Stevens et al. "The Crosslinking of Cotton Celluose with Ethyleneurea Derivatives Having Varying Hydrogen–Bonding Capabilities I. Effects on the Physical Properties and the Hydrogen–Bonded Structures" Textile Research Journal (Aug. 1970 40(8), 749–60.*

Stevens et al. "The Crosslinking of Cotton Celluose with Ethyleneurea Derivatives having Varying Hydrogen–Bonding Capabilities II. Accessibility Determinations" Journal of Applied Polymer Science,received May 1970 14, (7) pp. 1691–700.*

(List continued on next page.)

*Primary Examiner*—Margaret Einsmann
(74) *Attorney, Agent, or Firm*—Jacqueline S. Larson

(57) ABSTRACT

Provided are compounds and methods for modifying a material to change properties of the material, as well as a variety of products obtained using the methods. In one embodiment, a material comprising one or more modifiable functional groups is reacted with an activated hydrophobic acyl group in the presence of a hindered base, thereby to covalently attach the hydrophobic acyl group to the modifiable functional groups on the material. The material which is modified may be, for example, a carbohydrate, and the modifiable functional groups on the material may be hydroxyls. For example, materials such as cellulose may be modified by reacting it with an acid chloride or acid anhydride including a hydrophobic acyl group, in the presence of a hindered base, such as tripentylamine, to attach the hydrophobic acyl groups to the hydroxyls on the cellulose, thereby to increase the hydrophobicity of the cellulose. The methods and compounds disclosed herein may be used to modify materials to improve properties such as resistance, grease repellency, soil resistance and permanent press properties.

7 Claims, 8 Drawing Sheets

R'=OH, O-Si-(OH)$_2$-R

U.S. PATENT DOCUMENTS

| | | | | |
|---|---|---|---|---|
| 3,933,426 | A | * | 1/1976 | Martini et al. |
| 4,090,844 | A | | 5/1978 | Rowland |
| 4,152,115 | A | | 5/1979 | Silbert et al. ............. 8/121 |
| 4,396,391 | A | * | 8/1983 | North |
| 4,472,167 | A | | 9/1984 | Welch |
| 4,820,307 | A | | 4/1989 | Welch et al. |
| 4,936,865 | A | | 6/1990 | Welch et al. |
| 5,205,836 | A | | 4/1993 | Hansen et al. |
| 5,221,285 | A | | 6/1993 | Andrews et al. |
| 5,273,549 | A | | 12/1993 | Didier et al. |
| 5,549,791 | A | | 8/1996 | Herron et al. |
| 5,658,378 | A | | 8/1997 | Tsai et al. ............. 106/207.2 |

FOREIGN PATENT DOCUMENTS

| | | |
|---|---|---|
| EP | 0 860542 A2 | 8/1998 |
| EP | 0 860542 A3 | 4/1999 |
| GB | 343104 | 2/1931 |
| GB | 699530 | 11/1953 |
| WO | WO 84/04765 | 12/1984 |
| WO | WO 95/23804 | 9/1995 |
| WO | WO 96/13632 | 5/1996 |
| WO | WO 98/30387 | 7/1998 |

OTHER PUBLICATIONS

M. W. Rutenberg and Solarek, C.X. "Starch Derivatives; Production and Uses", in *Starch: Chemistry and Technology*, 1984, Academic Press XP–002109743.

PCT Internat.1 Search Report, dated Oct. 5, 1999, for US99/06382, corresponding to present invention.

Kang, I.–S. *Text. Res. J.* 68(11): 865–870 (1998).

Yang, C.Q. et al. *Text. Res. J.* 67(5): 334–342 (1997).

Yang, C.Q. *Text. Res. J.* 68(5): 457–464 (1997).

* cited by examiner dimethyloldihydroxy-
ethyleneurea

Hydrophobic DMDHEU Derivatives

MODIFIED TEXTILES AND OTHER MATERIALS AND METHODS FOR THEIR PREPARATION

This is a divisional of application Ser. No. 09/586,185, filed on Jun. 1, 2000, now U.S. Pat. No. 6,485,530, which is a divisional of application Ser. No. 09/274,751, filed on Mar. 23, 1999, now abandoned, which claims the benefit of U.S. Provisional patent applications Serial No. 60/080,185, filed Mar. 24, 1998, Ser. No. 60/093,820, filed Jul. 23, 1998, Ser. No. 60/093,911, filed Jul. 23, 1998; Ser. No. 60/105,890, filed Oct. 27, 1998, and Ser. No. 60/117,641, filed Jan. 28, 1999; the disclosures of each of which are incorporated herein by reference in their entirety.

TECHNICAL FIELD

This invention relates generally to methods for the modification of textile and other materials, for example by the attachment of hydrophobic moieties, to impart properties thereon such as water repellency and permanent press.

BACKGROUND ART

Most chemical research in the textile field was conducted in the 1950s, 60s, and 70s. This work has been extensively reviewed. For example, see: Smith and Block, *Textiles in Perspective*, Prentice-Hall, Englewood Cliffs, N.J., 1982; *Handbook of Fiber Science and Technology*, Marcel Dekker, New York, N.Y., Vols. I–III, 1984; S. Adanur, *Wellington Sears Handbook of Industrial Textiles*, Technomic Publishing Company, Inc., Lancaster, Pa., 1995; and Philip E. Slade, *Handbook of Fiber Finish Technology*, Marcel Dekker, New York, 1998). A large majority of this published research was never commercialized due to inhibitory costs or the impracticality of integration into textile production processes. There has been less research in this area in recent years. Most current work is centered on optimizing existing technology to reduce costs and comply with recent government regulations.

Methods have been developed in the art for making textile materials water repellent. The terms "water repellent" and "waterproof" are distinguishable as related to textiles. Water repellent fabrics generally have open pores and are, permeable to air and water vapor. Waterproofing involves filling the pores in the fabric with a substance impermeable to water, and usually to air as well. For the purpose of everyday clothing, water repellent fabric is preferable because of the comfort afforded by the breathability of the clothing.

Current commercial processes for producing water repellent fabrics are based on laminating processes (C. J. Painter, *Journal of Coated Fabrics*, 26:107–130 (1996)) and polysiloxane coatings (Philip E. Slade, *Handbook of Fiber Science and Technology*, Marcel Dekker, New York, N.Y., Vol. II, 1984, pp. 168–171). The laminating process involves adhering a layer of polymeric material, such as Teflon®, that has been stretched to produce micropores, to a fabric. Though this process produces durable, water repellent films, it suffers from many disadvantages. The application of these laminants requires special equipment and therefore cannot be applied using existing textile processes. Production of the film is costly and garments with this modification are significantly more expensive than their unmodified counterparts. The colors and shades of this clothing can be limited by the coating laminate film color or reflectance. Finally, clothing made from this material tends to be heavier and stiffer than the untreated fabric. This material also can be disadvantageous due to mismatched expansion and shrinkage properties of the laminate. Polysiloxane films suffer from low durability to laundering which tends to swell the fabric and rupture the silicone film.

Methods of imparting hydrophobic character to cotton fabric have been developed including the use of hydrophobic polymer films and the attachment of hydrophobic monomers via physi- or chemisorptive processes. Repellents used based on monomeric hydrocarbon hydrophobes include aluminum and zirconium soaps, waxes and waxlike substances, metal complexes, pyridinium compounds, methylol compounds, and other fiber reactive water repellents.

One of the earliest water repellents was made by non-covalently applying water soluble soap to fiber and precipitating it with an aluminum salt. *J. Text. Res.* 42:691 (1951). However, these coatings dissolve in alkaline detergent solution, therefore washfastness is poor. Zirconium soaps are less soluble in detergent solutions (Molliet, *Waterproofing and Water-Repellency*, Elsevier Publ. Co., Amsterdam, 1963, p. 188); however, due to the non-covalent attachment to the fabric, abrasion resistance and wash fastness are poor. Fabric also has been made water repellent by coating it with a hydrophobic substance, such as paraffin. *Text. Inst. Ind.* 4:255 (1966). Paraffin emulsions for coating fabrics are available, for example, Freepel® (BF Goodrich Textile Chemicals Inc., Charlotte, N.C.). Waxes are not stable to laundering or dry cleaning. Durability is poor due to non-covalent coating of the fabric and breathability is low.

Quilon chrome complexes polymerize to form —Cr—O—Cr— linkages (R. J. Pavlin, *Tappi*, 36:107 (1953)). Simultaneously, the complex forms covalent bonds with the surface of fibers to produce a water repellent semi-durable coating. Quilon solutions require acidic conditions to react thus causing degradation of the fiber through cellulose hydrolysis. Fabric colors are limited by the blue-green coloration imparted by the complex.

Pyridinium-type water repellents have been reviewed by Harding (Harding, *J Text. Res.*, 42:691 (1951)). For example, an alkyl quaternary ammonium compound is reacted with cellulose at elevated temperatures to form a durable water-repellent finish on cotton (British Patent No. 466,817). It was later found that the reaction was restricted to the surface of the fibers (Schuglen et al., *Text. Res. J.*, 22:424 (1962)) and the high cure temperature weakened the fabric. Pyridine liberated during the reaction has an unpleasant odor and the fabric had to be scoured after the cure. The toxicological properties of pyridine ended its use in the 1970s when government regulations on such substances increased.

Methylol chemistry has been extensively commercialized in the crosslinking of cellulose for durable press fabrics. N-methylol compounds are prepared by reaction of an amine or amide with formaldehyde. Alkyl-N-methylol compounds can be reacted at elevated temperatures in the presence of an acidic catalyst with the hydroxyl groups of cellulose to impart durable hydrophobic qualities to cotton. British Patent Nos. 463,300 (1937) and 679,811 (1952). The reaction with cellulose is accompanied by formation of non-covalently linked (i.e., non-durable) resinous material, thus decreasing efficiency. In addition, the high temperature and acid catalyst reduces the strength of the fabric. Recently, the commercial use of methylol compounds has been decreasing due to concerns of toxic formaldehyde release from fabrics treated in such a manner.

Long-chain isocyanates have been used to hydrophobically modify cotton. British Patent No. 461,179 (1937); Hamalainen, et al., *Am. Dyest. Rep.*, 43:453 (1954); and British Patent No. 474,403 (1937)). The high toxicity of isocyanates and significant side reactions with water, however, precluded it from commercial use. To, circumvent the water sensitivity of isocyanates, alkyl isocyanates were reacted with ethylenimine to yield the less reactive aziridinyl compound which was subsequently reacted with cellulose. German Patent No. 731,667 (1943); and British Patent No. 795,380 (1958). Though the toxicity of the aziridinyl compound was reduced compared to the isocyanate, the procedure still required the handling of toxic isocyanate precursors. Also, the high cure temperature weakened the cellulose and crosslinkers were needed to increase structural stability. Alkyl epoxides have been reacted with cellulose under acidic or basic conditions to produce water repellent cotton. German Patent No. 874,289 (1953). Epoxides are, in general however, not very reactive and require long reaction times at high temperatures and therefore have not been extensively commercialized.

Acylation of cotton with isopropenyl stearate from an acidic solution of benzene and curing was used to produce a hydrophobic coating for cotton. U.S. Pat. No. 4,152,115. The high cure temperature and acid catalyst however weakens the cotton. This method disadvantageously uses carcinogenic and flammable solvents. The practicality of using flammable solvents in fabric finishings is limited. Alkyl vinyl sulfones have been reacted with cellulose in the presence of alkali to form a water repellent finish. U.S. Pat. No. 2,670,265. However, this method has not been commercialized because the alkali is not compatible with crosslinking reactants required for permanent press treatments.

Methods have been developed for imparting grease repellent properties to materials such as cotton. Perfluoroalkanoic acids have been applied in a variety of ways including as chromium complexes and as quaternary amines. U.S. Pat. No. 2,662,835; Phillips et al., *Text. Res. J.*, 27:369 (1957); Tripp et al., *Text. Res. J.*, 27:340 (1957); and Segal et al., *Text. Res. J.*, 28:233 (1958). Since these finishes are non-covalently linked to the fabric, they are not durable to laundering. Attempts were made to covalently link fluorocarbons to cotton with perfluorinated acid chlorides in the presence of the base pyridine and dimethylformamide solvent (Benerito et al., *Text. Res. J.*, 30:393–399 (1960)), however significant problems were encountered. The pyridine base formed an insoluble complex with the acid chloride that could only be overcome with the addition of large excesses of pyridine or the solvent dimethylformamide. Also, the finish was readily subject to hydrolysis and not durable to laundering. Repellent finishes made by reaction of glycidyl ethers of 1,1-dihydrofluoroalkanols with cellulose (Berni et al., *Text. Res. J.*, 30:576–586 (1960)) produced a more durable finish, but required a reaction time of 30 h at 100° C. and were not extensively commercialized. Interest in monomeric fluorocarbon finishes has been superseded by the use of fluorinated polymer films.

Methods also have been developed for modifying cotton by crosslinking in order to impart permanent press properties to the material. These methods have been reviewed in: R. M. Rowell and R. A. Young, Eds., *Modified Cellulosics*, Academic Press, New York, 1978; M. Levin and S. Sello, Eds., *Handbook of Fiber Science and Technology*, Vol. 2, Part A, Marcel Dekker, New York, 1984, pp. 1–318; and G. Hermanson, *Bioconjugate Techniques*, Academic Press, San Diego, Calif., 1996, pp. 169–297. The covalent crosslinks prevent the cellulose chains from slipping, thus imparting high durable press characteristics. However, the short and stiff crosslinks cause the cotton structure to become brittle and display poor tear strength. A variety of textile resins have been developed to crosslink cellulose and impart durable-press properties, such as polymethylol compounds formed by the reaction of aldehydes with amines. They include melamineformaldehyde (British Patent Nos. 458, 877, 466,015 and 468,677), dimethylolethyleneurea (U.S. Pat. Nos. 2,416,046, 2,416,057, 2,425,627, 2,436,311, 2,373,136, and 2,899,263; and British Patent Nos. 603,160 and 577,735), and urons/triazones (U.S. Pat. Nos. 2,373, 135; and 2,321,989; British Patent Nos. 575,260 and 845, 468; German Patent No. 1,123,334; *Angew. Chem.*, 60:267 (1948); *Am. Dyest. Rep.*, 48:44 (1959); and *Tex. Res J.*, 29:170 (1959).

Dimethyloldihydroxyethyleneurea (DMDHEU) has been used in the production of durable-press garments. *Text. Res. J.*, 51:601(1981). However, the DMDHEU system retains chlorine and causes yellowing and tendering of the cloth; therefore it is not suitable for use with white cloth. Resins have been developed specifically for use with white cloth that are esters of carbamic acid (carbamates). U.S. Pat. Nos. 3,639,455, and 4,156,784; Japanese Patent No. 599,505; British Patent Nos. 1,227,366, and 1,523,308; and French Patent Nos. 1,576,067 and 7,532,092. The crosslinking of the cellulose and polymerization of the resin generally occurs at the same time on the fabric. U.S. Pat. Nos. 5,447,537, 4,975,209, 4,936,865, 4,820,307, and 3,995,998.

Methods for modifying materials with reactive groups such as hydroxyls and amines have been developed in the art, however, materials with hydroxyl groups, including polysaccharides such as cellulose, have been found to be difficult to covalently modify and therefore require reactive modifiers or extreme conditions. Methods of reacting with hydroxyls that have been developed in the chemistry field include the use of acid chlorides, anhydrides, succinimides, and carbonyldiimidazole. See, e.g., J. March, "Advanced Organic Chemistry-Reactions, Mechanisms and Structure,", 3rd Ed., John Wiley and Sons, New York, 1995; and G. Hermanson, "Bioconjugate Techniques," Academic Press, Inc., San Diego, 1996.

There is a need for methods for modifying various substrate materials, such as textile fibers of cotton or other cellulosic materials, wool, silk and other proteinaceous fibers, and various other natural, man made, regenerated and synthetic fiber materials to alter and optimize their properties for use in different applications. There is a need for methods for improving the properties of cloth or fabric materials containing various natural, man made and/or synthetic fibers of various types, in order to improve various performance properties such as water resistance, soil resistance, speed of drying and permanent press properties. There further is a need for methods for producing modified textile fiber materials and other substrates which may be used in a wide range of applications including clothing and apparel fabrics, and various items of apparel, socks, hosiery, fabrics for footwear, shoes, home furnishing, fabrics for upholstery and window treatments including curtains and draperies, and fabrics for outdoor furniture and equipment, as well as for industrial textile end uses.

DISCLOSURE OF THE INVENTION

Provided are methods of modifying various substrate materials to alter the properties of the materials. In particular, compositions and methods are provided that permit the modification of a variety of textile fiber materials and similar substrates to alter properties including water repellency, grease repellency, soil resistance, oil or grease resistance, permanent press, detergent free washing, increased speed of drying, and improving strength and abrasion resistance. The methods also permit improvement of comfort of fibers, wherein the fibers are used alone or in combinations or blends with one or more others before or after, treatment.

In one embodiment, provided are methods of modifying a material to increase its hydrophobicity as well as a variety of products obtained using the methods. A material comprising one or more modifiable functional groups is reacted with an activated hydrophobic acyl group, such as an acid chloride or anhydride, in the presence of a hindered base, to covalently attach the hydrophobic acyl group to the modifiable functional groups on the material. The presence of the hindered base advantageously neutralizes unwanted side reactions by acids such as HCl produced during the reaction.

The material which is modified may comprise a carbohydrate, and the modifiable functional groups on the material may comprise hydroxyls. Cellulose in natural or regenerated form may be modified by reacting it with an activated hydrophobic acyl group, such as an acid chloride or acid anhydride, in the presence of a hindered base, such as tripentylamine, to attach the acyl groups to the hydroxyls on the cellulose, to increase the hydrophobicity of the cellulose.

Cellulose may be reacted with an activated acyl group, such as an acid chloride, RCOCl, or anhydride, $(RCO)_2O$, wherein R is a straight chain C8–C20 saturated hydrocarbon, for example a C10–C20 saturated hydrocarbon. Exemplary acid chlorides include hexadecanoyl chloride and polyethylene acid chlorides.

A cellulosic or other material may be reacted with an activated acyl group such as an acid chloride, $R(CH_2)_2COCl$ or anhydride, $(R(CH_2)_2CO)_2O$, wherein R is a C1–C10 fluorocarbon. For example, R may be $CF_3$—, or $CF_3(CF_2)_n$— wherein n is, for example, 1 to 10.

In a second step, the material may be further modified in a second reaction with a small organic acid chloride, such as acetyl chloride, to acylate unreacted groups, such as hydroxyls, on the material.

A method of modifying a textile material also is provided comprising reacting the material with an alkyl silane, thereby to covalently attach the alkyl silane to the material. The alkyl silane has, for example, the formula $RSiX_1X_2X_3$, where R is a hydrocarbon or fluorocarbon, and one or more of $X_1$, $X_2$, and $X_3$ are independently a halo or alkoxy group, and the remainder of $X_1$, $X_2$, and $X_3$ are independently alkyl. In one embodiment, $X_1$, $X_2$, and $X_3$ are independently chloro, ethoxy and methoxy, and the remainder of $X_1$, $X_2$, and $X_3$ are methyl. The material is, for example, a cellulose or wool containing material.

Also is provided a method of modifying a textile material to increase the hydrophobicity of the material, the method comprising crosslinking the material with hydrophobically modified dimethyloldihydroxyethyleneurea. The textile material is, for example, a carbohydrate containing material and the dimethyloldihydroxy-ethyleneurea comprises, for example, a covalently attached hydrocarbon or fluorocarbon group.

Also provided is a method of modifying a cellulosic material, such as a cotton material, the method comprising crosslinking the material with a functionalized glucose molecule comprising a reactive group such as an isothiocyanate, isocyanate, acyl azide, sulfonyl chloride, aldehyde, glyoxal, oxirane, carbonated imidoester, carbodiimide, succinimide ester, epoxide, alkyl halide, anhydride, acid chloride, or an activated ester.

The methods disclosed herein may be used to modify various substrate materials, such as textile fibers of cotton or other cellulosic materials, wool, silk and other proteinaceous fibers, and various other natural, regenerated and synthetic fiber materials to alter and optimize their properties for use in different applications. Materials containing various natural, regenerated, man made and/or synthetic fibers in the form of cloth or fabric of various types may be modified, in order to improve various performance properties such as water resistance, soil resistance, oil or grease resistance, speed of drying and permanent press properties, such as smoothness or wrinkle resistance and "wash and wear".

Materials comprising cellulose may be modified and are described by way of example. A variety of other materials, such as other polysaccharides or polyamines, also may be modified, for example, to improve their hydrophobicity by the covalent attachment of hydrophobic groups. Cellulose containing materials which may be modified include cotton materials and various types of regenerated cellulose, such as rayon, including viscose rayon and lyocell, other natural cellulosics such as linen; ramie and the like, in fiber, yarn or fabric form, which may be either undyed or dyed prior to the reaction. Hydrophobic cellulosic material can be made with selected covalently attached hydrophobic groups to improve properties of the cellulosic substrate such as water resistance and permanent press properties. Proteinaceous fibers including silk, wool, camel's hair, alpaca and other animal hairs and furs and regenerated protein fibers may be modified, as well as synthetic fibers including polyamides, such as nylon 6 and 66, various polyesters, including polyethylene, glycol terephthalate and derivatives thereof and polytrimethylene terephthalate and other synthetic fibers with suitable reactive properties. Various of these types of fibers also can be blended with one or more other fibers, before or after treatment, e.g. cotton or rayon and polyester, or wool and polyester, together, or with silk, linen or rayon added. The modified materials obtained as disclosed herein may be used in a variety of applications, such as the fabrication of clothing and various items of wearing apparel, socks, hosiery, footwear, shoes, home furnishing fabrics including upholstery and window treatments including curtains and draperies, and fabrics for outdoor furniture and equipment, as well as for industrial textile end uses.

MODES FOR CARRYING OUT THE INVENTION

Figure 1:
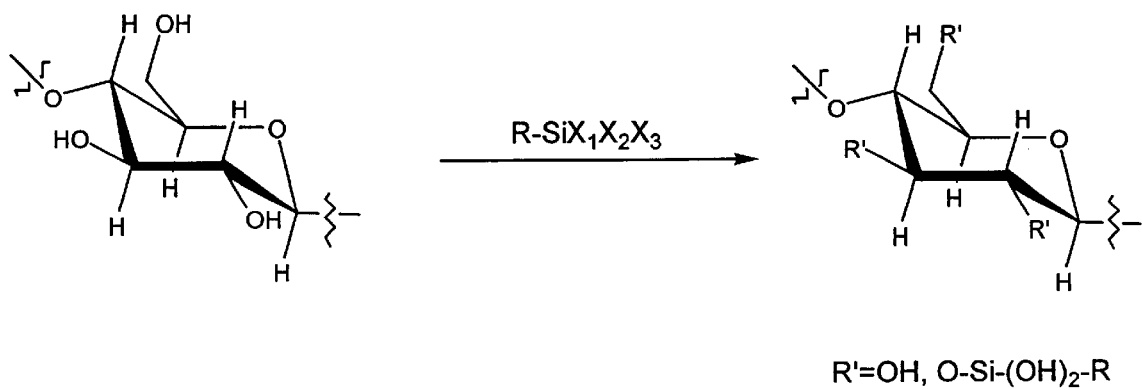
FIG. 1 is a scheme showing the reaction of alkyl silanes with hydroxyl groups on a saccharide moiety.

Methods and compounds for modifying materials, as well as modified materials produced by the methods are provided. In one embodiment, materials are modified by the attachment of hydrophobic groups. Using the methods disclosed herein, a variety of materials including textiles, such as cellulosic textile materials, including cotton fiber, as well as fibers of proteinaceous materials such as wool and silk, and synthetic fiber materials, such as nylon, and various man made materials such as regenerated cellulose or regenerated protein, are modified to impart selected properties on or to the material. Desirable properties that can be imparted to the modified materials include water repellency, durability to dry cleaning and laundering, detergent-free washing, resistance to abrasion and soiling, grease resistance, increase strength and enhanced comfort.

Materials

A variety of materials, including textile fibers, yarns and fabrics can be modified as disclosed herein. The materials can be modified in one embodiment by the covalent or noncovalent attachment of certain polymers and monomers to the material. In one embodiment, materials comprising modifiable functional groups may be modified, for example, by the attachment of hydrophobic groups. The modifiable functional groups in the materials are, for example, capable of covalently reacting to attach a compound or polymer, for example, comprising a hydrophobic group to the material. Exemplary modifiable functional groups include amine groups, hydroxyl groups, thiol groups, and carboxylic acid groups. The modifiable functional groups also can permit the modification by non-covalent attachment of certain polymers or monomers, for example, by hydrogen bonding interactions, or hydrophobic interactions.

Exemplary materials that can be modified as disclosed herein include carbohydrates, such as polysaccharides. Exemplary polysaccharides include dextran, starch or cellulose. Other exemplary materials include leather and natural textile fiber materials, such as wool or silk, as well as fiber of synthetic polymers such as polyamines and polyamides, e.g., nylon, and proteinaceous materials, such as wool and silk. Man made materials may be modified such as regenerated cellulose and viscose rayon, and regenerated proteins, and various cellulose acetates. Other synthetic polymer materials also may be modified, such as polyesters, polyethers, polyacrylics, various modified acrylics, polyurethanes, and combinations thereof with other monomers and polymers.

In one embodiment, materials comprising amino acids, for example in the form of poly(amino acids), may be modified. For example, in one embodiment, wool and silk materials comprising proteins may be modified as disclosed herein.

Cellulosic Materials

In one embodiment, a variety of cellulose containing materials may be modified as disclosed herein. Exemplary materials include textile fabrics for clothing and apparel, paper materials, such as filters, and other materials such as chromatography materials. For example, cotton fibers or cloth made of such fibers may be modified.

Cellulose containing materials are modified, for example, by the covalent attachment of hydrophobic groups. The modification of cotton material can improve properties of the cotton, such as its water repellent characteristics, or permanent press properties. Advantageously, the cotton containing materials may be modified after procedures such as dyeing of the cotton. The cotton material may be also provided as a blend with other natural and/or synthetic materials, either before or after the modification step wherein, for example, the hydrophobic groups are covalently attached.

Cellulose is a mostly linear polymer of glucose units connected by β-1,4-linkages as shown below:

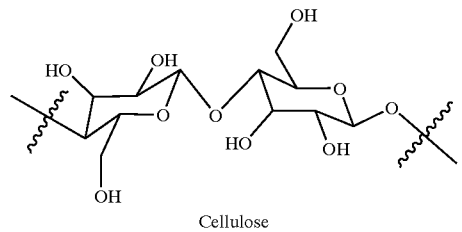

Cellulose

Each strand of natural cellulose is from 2000 to 3000 glucose units long. The cellulose polymers are easily hydrolyzed by acid. The cellulose molecules form fibrils in which the majority of the molecules are oriented in the direction of the fiber axis, giving the fiber its strength. Between the crystalline regions are semicrystalline and amorphous areas. The configuration of the fiber is stabilized by hydrogen bonds and van der Waals forces.

In cellulose, each glucose unit contains three hydroxyl groups which gives cellulose its hydrophilic characteristics. Using the methods disclosed herein, these hydroxyl groups may be chemically modified to alter its properties. For example, the hydroxyl groups may be modified with hydrophobic groups, such as hydrocarbon and fluorocarbon groups, to impart hydrophobic characteristics to the cellulose, and consequently, to materials, such as clothing made from the cotton.

Amino Acid Containing Materials

In one embodiment, materials comprising poly(amino acids), such as proteins, may be modified as disclosed herein. For example, wool or silk materials may be modified. Wool materials, for example, may comprise a protein such as keratin, which may be modified as disclosed herein.

Materials comprising amino acids, for example, comprising proteins, may be modified as disclosed herein, by modification of substituents on the amino acid side chains. For example, the hydroxyl on serine, threonine, or tyrosine may be modified. The side chain on lysine, arginine and histidine may be modified. The carboxylic acid group on aspartate and glutamate may be modified. The amide group on asparagine and glutamine may be modified, as well as the thiol group on cysteine. Modification can occur, for example, by the covalent or non-covalent attachment of compounds, including monomers and polymers, that alter properties of the material as disclosed herein.

Covalent Attachment of Hydrophobic Groups

A variety of materials with modifiable functional groups, such as amine and hydroxyl, may be modified as disclosed herein. While, in one embodiment, the modification is described in detail herein with respect to cellulose by way of, example, other materials including hydroxyl or other modifiable groups may be modified by the methods disclosed herein.

Covalent Attachment of Acyl Groups Using a Hindered Base

In one embodiment, functional groups, such as hydroxyl groups, can be modified by the covalent attachment of an acyl group. Hydroxyl groups have been found to be fairly difficult to covalently modify and therefore require reactive reagents to modify them. Methods of reacting reagents with hydroxyls have been developed in the art of chemistry including the use of acid chlorides, anhydrides, succinimides, carbonyldiimidazoles. These methods, however, are sensitive to water and therefore water must be excluded from these reactions or excesses of reactants can be used. Acid chlorides (and sometimes anhydrides) are advantageous because they are readily available and do not require prior deprotonation of the target hydroxyls. However, the reaction of acid chlorides with hydroxyls produces HCl, which disadvantageously can hydrolyze or otherwise degrade the material. For example, the reaction of acid chlorides with cellulose can cause hydrolysis and degradation of the cellulose material, such as cotton or rayon containing fabric for apparel or upholstery.

In one embodiment, this problem is overcome by the use of a hindered base in the reaction of an activated acyl group, such as acyl chloride, with a modifiable functional group, such as a hydroxyl. An exemplary reaction scheme, wherein an acid chloride is reacted with a hydroxyl group on cellulose, in the presence of a hindered base, is shown in Scheme I below:

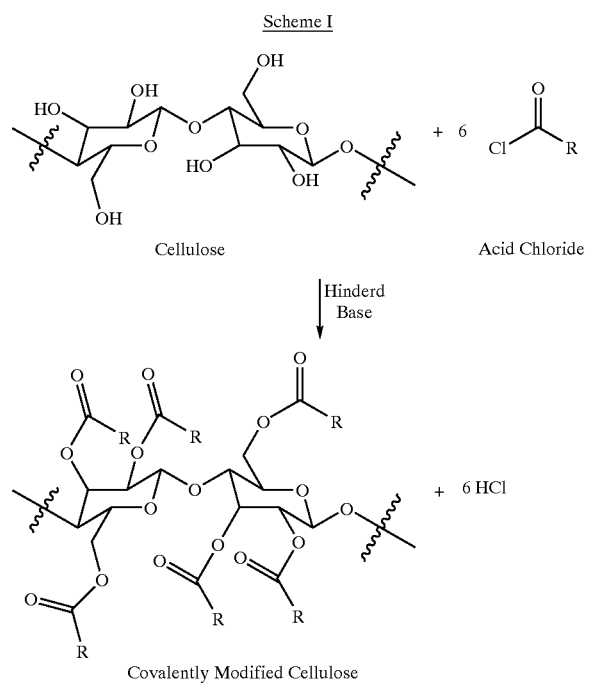

The presence of the hindered base, such as tripentylamine, advantageously neutralizes the HCl produced in the reaction, and promotes acylation without degradation of the treated material. In contrast, relatively unhindered bases, such as pyridine and triethylamine, do not give desirable results. While not being limited to any theory, it is possible that the improved results may be due to steric hindrance of the pentyl groups or solubility of the base.

While the covalent attachment of hydrophobic groups using acid chlorides and anhydrides in the presence of a hindered base is disclosed herein in detail, other activated acyl groups may be used in the presence of the hindered base, as well as other methods of covalent attachment.

As used herein, the term "hindered base" refers to a base that is capable of promoting an acylation reaction while minimizing degradation of the material being acylated. Preferred are hindered amine bases including three straight, or branched carbon chains, wherein each chain includes at least three carbons.

In one embodiment, the hindered base has the formula:

$R_1R_2R_3N$ wherein $R_1$, $R_2$, and $R_3$ are independently a C3–C10 branched or straight chain saturated or unsaturated hydrocarbon. Preferably, $R_1$, $R_2$, and $R_3$ are independently a C4–C8 straight chain saturated hydrocarbon. For example, in a preferred embodiment, the hindered base is tripentylamine, or tributylamine. Additionally the hindered amine may be a cyclic amine, such as 1,8-bis(dimethylamino)naphthalene, or N-methylaniline. Other bases include 1,8-diazabicyclo [5.4.0.] undec-7-ene, N-methylmororpholine, and N-methylaminopyridine.

Reaction Conditions Using Hindered Bases

The reaction of the activated acyl group with the modifiable functional groups, such as a hydroxy, for example on cellulose, may be conducted, in one embodiment, by using a concentration of the hindered base which is in excess of the concentration of the activated acyl group. For example, the reaction may be conducted neat or in an organic, preferably anhydrous solvent, such as ether or methyl sulfoxide, dioxane, tetrahydrofuran or dimethylformamide. The temperature of the reaction may be varied depending on the reagents and cellulose materials used. The temperature may be, for example, about 0° C. to 100° C., for example at room temperature (about 25° C.). After the reaction is complete, the cellulose may be optionally rinsed with an anhydrous organic solvent such as ether and dried. Optionally, the activated acyl group may be a gas, which is directly applied to the cellulose material, either in the presence or absence of a solvent.

In one embodiment, cellulose is reacted with an acid chloride containing a hydrophobic acyl group, such as hexadecanoyl chloride. The reaction is conducted, for example, with a molar ratio of 1.5:1 of the hindered base, such as tripentylamine, to the acid chloride. Optionally the reaction is conducted in a solvent such, as ether. For example, a reaction may be conducted with 0.1 g/ml cellulose, 1 M acyl chloride, and 1.5 M of the hindered base, such as tripentylamine, in a solvent such as ether. The reaction may be conducted in one embodiment at room temperature for about 1–12 hours for activated acyl groups containing longer hydrocarbon chains, such as those including greater than about 5 carbons, such as hexadecanoyl chloride. In the embodiment wherein more reactive activated acyl groups are used, shorter reaction times, for example 1 hour or less at room temperature may be used.

The cellulose material may be treated first with an activated acyl group, including a hydrophobic moiety, in order to acylate hydroxyl groups on the cellulose with the acyl group containing the hydrophobic groups. After the reaction is complete, the cellulose is reacted with a short carbon chain activated acyl group, such as acetyl chloride, to acylate any remaining accessible free hydroxyl groups. The reaction time at room temperature for the smaller acyl chlorides may be shorter, for example about 1 hour.

In another embodiment, the cellulose may be reacted sequentially or at once with different selected amounts of activated acyl groups, to provide a mixture of hydrophobic acyl groups covalently attached to the cellulose.

Hydrophobic Groups

A variety of hydrophobic groups may be attached to materials as described herein. As described above, in one embodiment, a material comprising a modifiable functional group, such as cellulose, is reacted with one or more activated acyl groups in the presence of a hindered base. While cellulose is discussed herein by way of example, other materials, including other polysaccharides, may be modified as disclosed herein, as well as materials containing amines.

For example, the activated acyl group may be an acid chloride or anhydride. Exemplary compounds are shown in Scheme II below. For example, the activated acyl group may be an acid chloride, RCOCl or anhydride $(RCO)_2O$. Mixed anhydrides also may be used. The R group may be selected to determine the properties of the cellulose, after acylation. R in one embodiment is a cyclic or branched or straight chain hydrocarbon or fluorocarbon.

The activated acyl group may be an acyl chloride, RCOCl or anhydride $(RCO)_2O$, wherein R is a C5 to C20 saturated or unsaturated branched cyclic or straight chain hydrocarbon, for example a straight chain C10–20 saturated hydrocarbon. The acid chloride may be, for example, hexadecanoyl chloride. For more hydrophobicity, longer chain lengths may be used.

In another embodiment, polymeric molecules, e.g., polyethylene acid chloride, maleic acid or polypropylene maleic acid chloride may be used. Exemplary polymeric activated acyl groups which can be used are shown in Formulas 1, 2 and 3 below, wherein m, n, o and p are independently about 10 to 10,000, e.g., about 100–10,000. The molecules of Formulas 2 and 3 are multifunctional and can attach at multiple sites on the cellulose, and can form "loops" and "trains" respectively on the cellulose.

The activated acyl group also may be an acid chloride, $R(CH_2)_2COCl$ or anhydride, $(R(CH_2)_2CO)_2O$, wherein R is a C1–C12 branched, cyclic or straight chain fluorocarbon. For example, R may be $CF_3$—. In another embodiment, R can be $CF_3(CF_2)_n$— wherein n is, for example, 0 to 10 (as shown in Formula 4 in Scheme II below). Fluorinated chains are generally more hydrophobic than hydrocarbon chains of the same length, so shorter chains may be used. For example, cellulose may be rendered hydrophobic by reaction with the activated hydrophobic acyl group, $CF_3(CF_2)_2(CH_2)_2COCl$. Mixtures of hydrocarbons and fluorocarbons can be used.

Exemplary acid chlorides or anhydrides which may be used to treat a materials such as cellulose or other carbohydrate material in the presence of a hindered base are shown in Scheme II below.

Scheme II

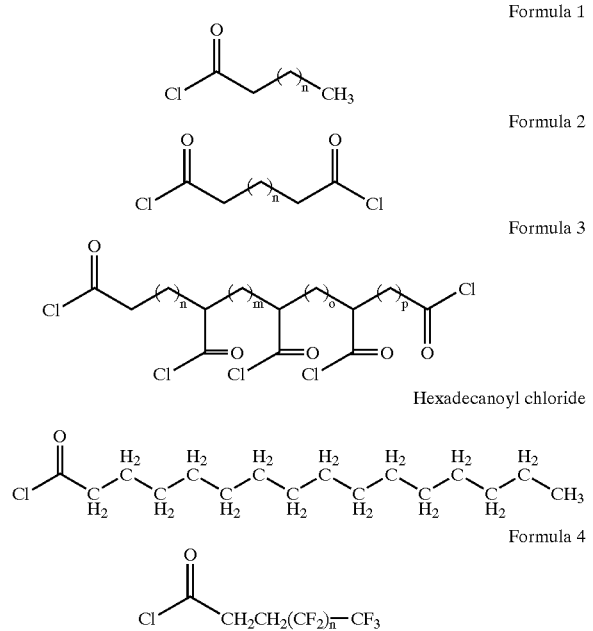

Formula 1

Formula 2

Formula 3

Hexadecanoyl chloride

Formula 4

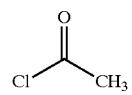

Acetyl chloride

The methods disclosed herein are advantageous, because in the presence of the hindered base materials, such as cellulose materials, including cotton, may be covalently modified with hydrophobic groups, without degradation of the cellulose. Thus, certain properties of the cellulose material, such as permanent press properties and stain resistance can be enhanced.

In another embodiment of the invention, the hydrophobicity of the modified material such as cellulose can be enhanced by a second reaction of the modified cellulose with a smaller hydrophobic molecule, such as acetyl chloride after the initial reaction. The smaller hydrophobic molecules can react, with any unreacted hydroxyl groups that the longer chain acid chlorides could not access, for example, for steric reasons. Different ratios of acyl groups may be selected and attached to provide selected hydrophobicity properties of the material such as cellulose.

Processes Using Hindered Base Method

Materials, such as wool or cellulose materials, such as cotton, may be treated as disclosed herein before or after treatment of the material with other reagents such as dyes. Thus, for example, material, such as cotton or wool may be processed by treatment with dyes, cutting, and/or processing into articles such as clothing, and the material may be hydrophobically modified at any stage of the process.

An exemplary process is shown below in Scheme III for the solution phase treatment of cotton with a long chain acyl chloride (Acyl Chloride $R_L$), such as hexadecanoyl chloride, and then reacting unreacted hydroxyl groups with a shorter chain acyl chloride (Acyl Chloride $R_S$), such as acetyl chloride, in the presence of a hindered base, such as tripentylamine. After the reaction, the hindered base can be regenerated by treatment with a strong base.

Scheme III

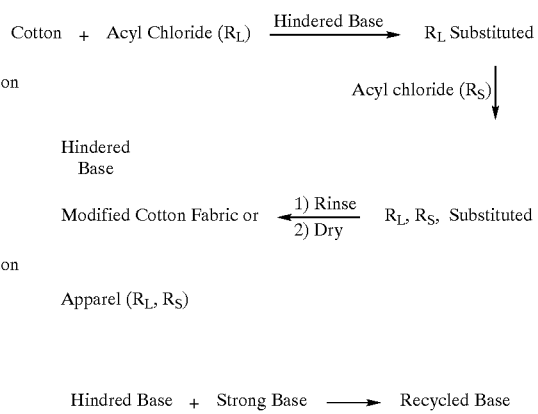

Other Methods of Covalent Attachment of Hydrophobic Groups

Other methods may be used to attach hydrophobic groups to materials such as cellulose and wool.

Modifiable functional groups on materials, such as cellulose and wool, also may be modified by reaction with alkyl silanes. For example, free hydroxyls on materials such as cellulose or wool may be reacted with alkyl silanes.

The alkylsilanes may be, for example, chlorosilanes, methoxysilanes or ethoxysilanes. Exemplary chlorosilanes include RSiCl$_3$, RSi(Me)Cl$_2$, and RSi(Me)$_2$Cl, wherein R is alkyl, for example a straight chain, branched or cyclic hydrocarbon, such as hexadecyltrichlorosilane, or haloalkyl, such as fluoroalkyl, for example, a straight chain, branched or cyclic fluorocarbon, such as (heptadecafluoro-1,1,2,2,-tetrahydrodecyl)trichlorosilane.

Exemplary ethoxysilanes include RSi(OEt)$_3$, RSi(Me)(OEt)$_2$, and RSi(Me)$_2$OEt, wherein R is alkyl, for example a straight chain, branched or cyclic hydrocarbon, such as hexadecyltriethoxysilane, or haloalkyl, such as fluoroalkyl, for example, a straight chain, branched or cyclic fluorocarbon, such as (heptadecafluoro-1,1,2,2,-tetrahydrodecyl)triethoxysilane.

An example is shown in FIG. 1, wherein a glucose moiety of cellulose is modified by the attachment of an alkylsilane. In FIG. 1, R is a hydrocarbon or fluorocarbon moiety, such as hexadecyl- or heptadecafluoro-1,1,2,2-tetrahydrodecyl. In FIG. 1, R—SiX$_1$X$_2$X$_3$ is an alkyl silane, such as a chlorosilane, methoxysilane or ethoxysilane, wherein one or more of X$_1$, X$_2$ and X$_3$, is, for example, chloro, ethoxy or methoxy, and the remainder of X$_1$, X$_2$ and X$_3$ are, for example, methyl; and R' is OH or OSi(OH)$_2$R.

Figure 2:
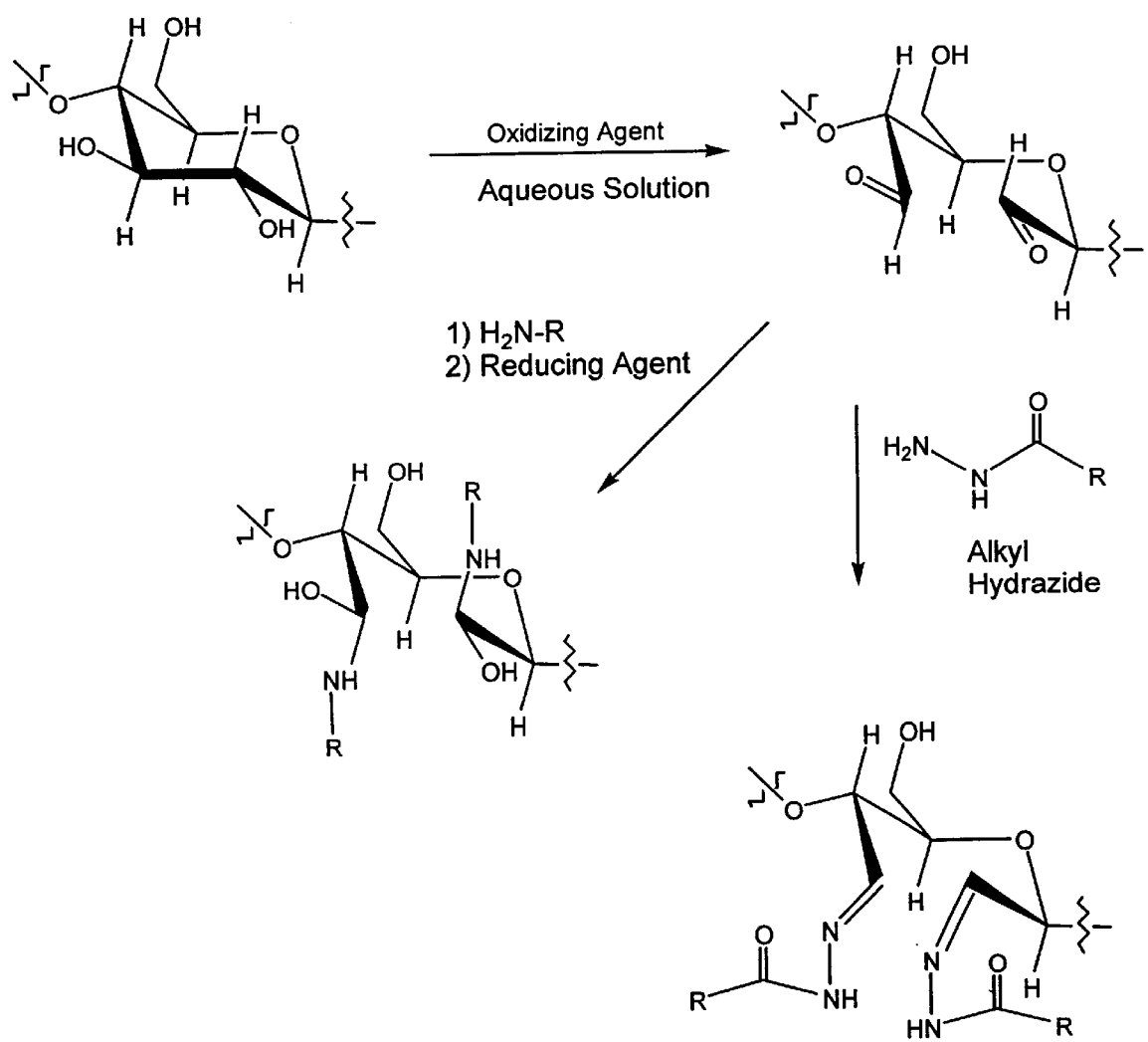
FIG. 2 is a scheme showing the formation of the dialdehyde of a glucose unit of cellulose, which is then reacted with an amine or hydrazide.

Materials including a saccharide moiety, such as a glucose moiety, one or more saccharide units may be oxidized, for example using aqueous sodium periodate, to form a reactive dialdehyde. The dialdehyde, for example, may be reacted with a hydrazide to form hydrazone linkages, or with an amine in the presence of a reducing agent, such as sodium cyanoborohydrate. An exemplary scheme of the formation of the dialdehyde of a glucose unit of cellulose is shown in FIG. 2. In FIG. 2, R is a hydrophobic group, such as a hydrocarbon or fluorocarbon.

Figure 3:
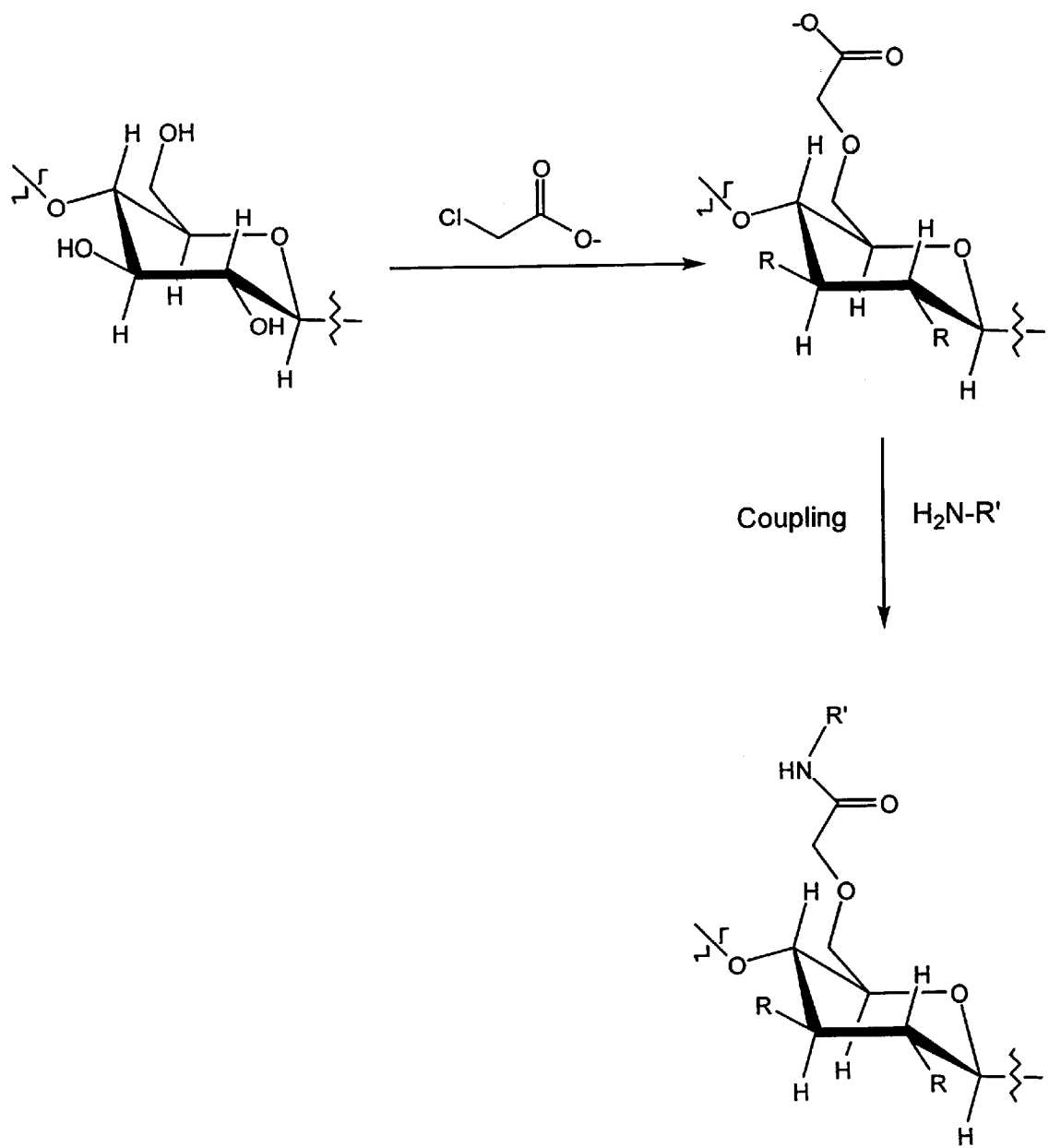
FIG. 3 is a scheme showing reaction of a glucose unit of cellulose with chloroacetic acid followed by coupling with an amine comprising a hydrophobic group.

Modifiable groups on materials may be activated with chloroacetic acid and then coupled to a compound such as an amine comprising a hydrophobic group. An exemplary scheme of the formation of the chloroacetic acid derivative of a glucose unit of cellulose by treatment with chloroacetic acid in alkaline buffer, followed by coupling with an amine is shown in FIG. 3. In FIG. 3, R' is a hydrophobic group, such as a hydrocarbon or fluorocarbon group. An exemplary coupling agent that can be used is EDC (1-ethyl-3-(3-dimethylaminbpropyl)carbodiimide). In FIG. 3, in the product, chloroacetic acid may attach in the reaction to any one or more of the free hydroxyls of the glucose unit. In the possible product shown in FIG. 3, R is OH or OCH$_2$CONHR'.

Figure 4:
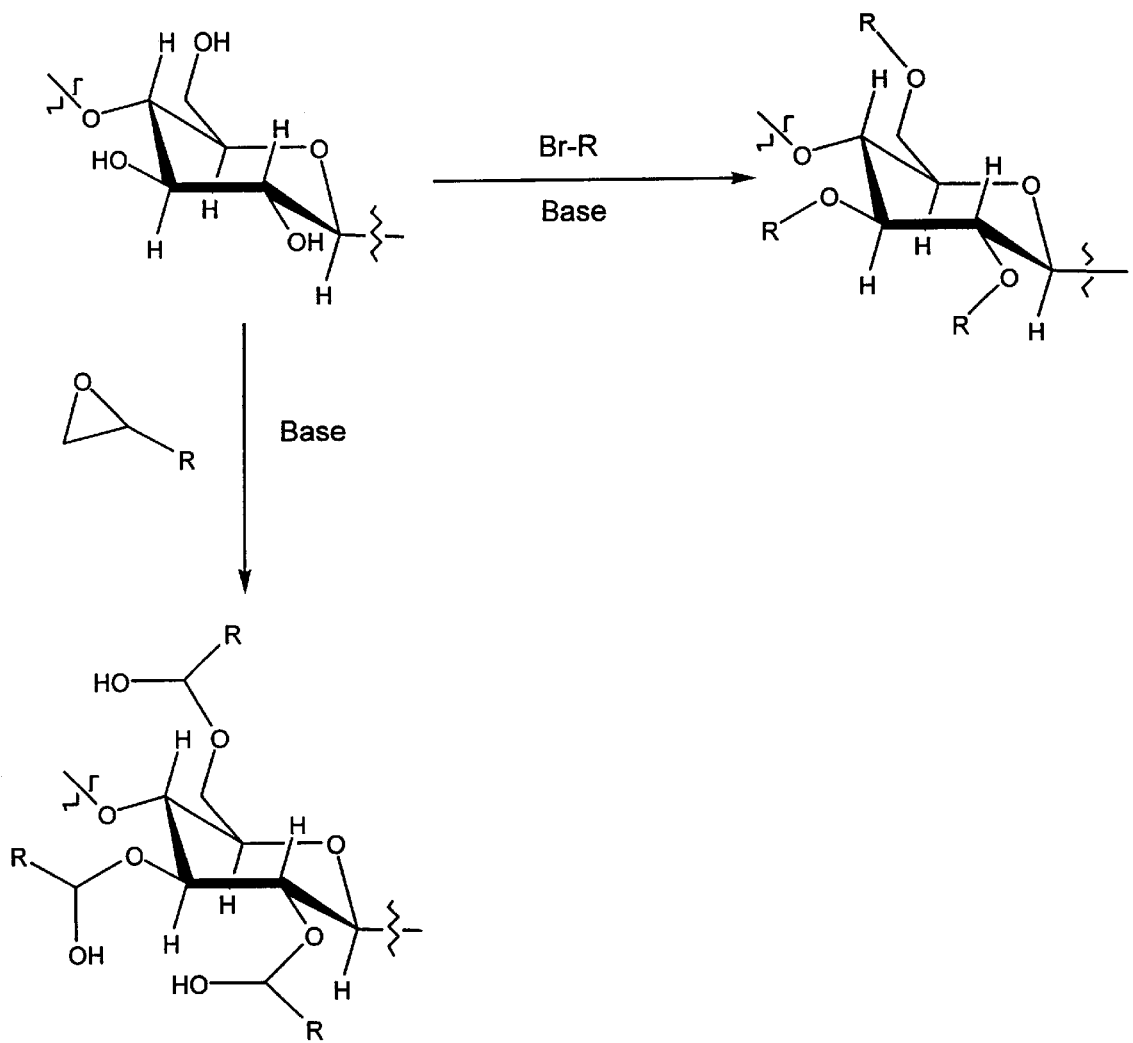
FIG. 4 is a scheme showing the reaction of hydroxyls on cellulose materials with bromides and epoxides.

Modifiable functional groups on materials, such as hydroxyls on cellulose materials, may be reacted with bromides and epoxides, for example in aqueous sodium hydroxide. An example of the reaction of hydroxyls on a glucose moiety of cellulose is shown in FIG. 4. In FIG. 4, R is, for example, a hydrophobic group, such as a hydrocarbon or fluorocarbon group.

Figure 5:
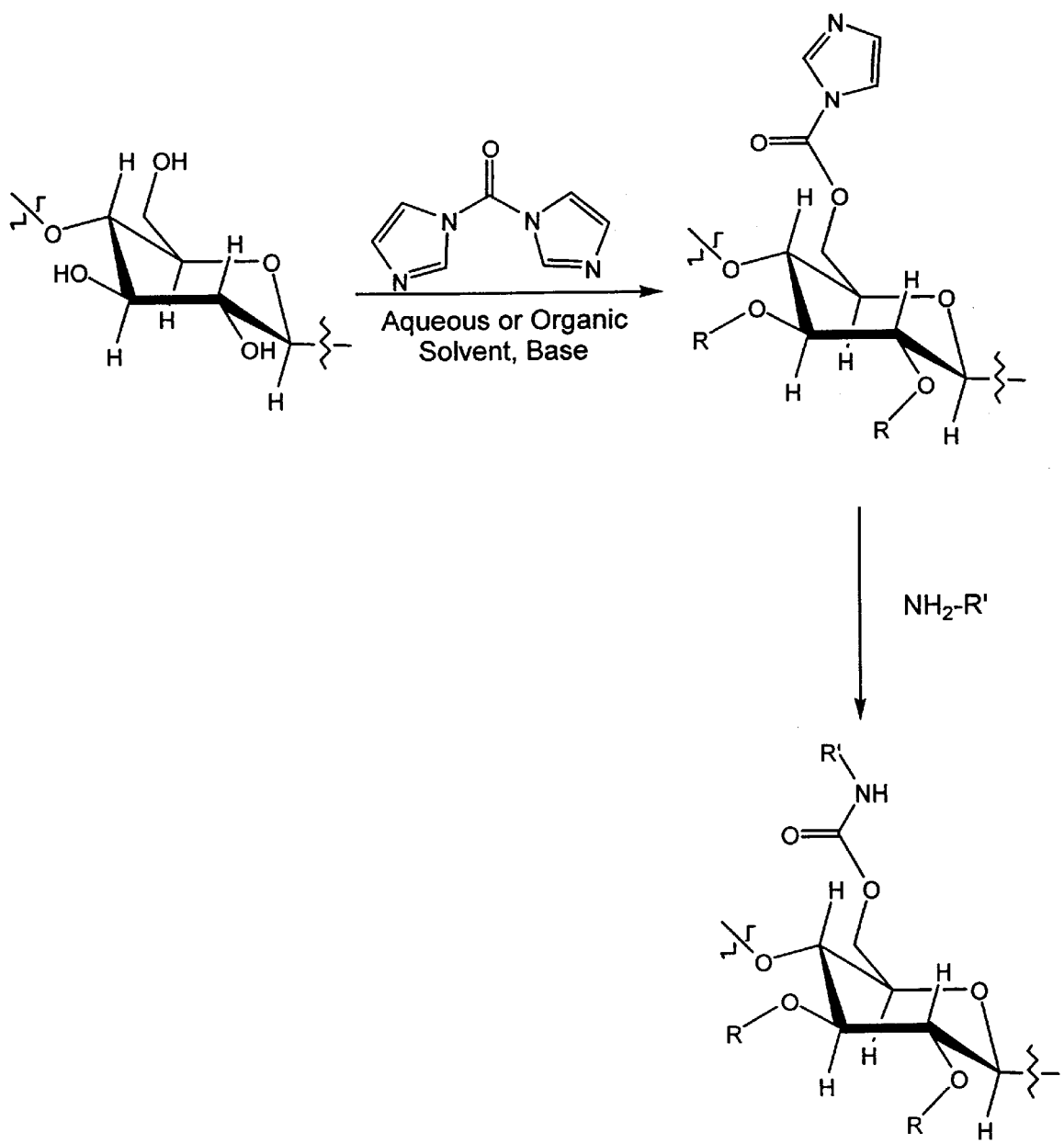
FIG. 5 is a scheme showing the reaction of hydroxyls on a glucose moiety of cellulose with carbonyldiimidazole followed by reaction with an amine.

Modifiable functional groups on materials, such as hydroxyls on cellulose materials, may be activated, for example, with carbonyldiimidazole (CDI). An example of the reaction of hydroxyls on a glucose moiety of cellulose with CDI followed by reaction with an amine is shown in FIG. 5. Any one or more of the hydroxyls of the glucose unit may react in the reaction. In the possible product shown in FIG. 5, OR is OH or OCONHR'. In FIG. 5, R' is, for example, a hydrophobic group, such as a hydrocarbon or fluorocarbon group.

Figure 6:
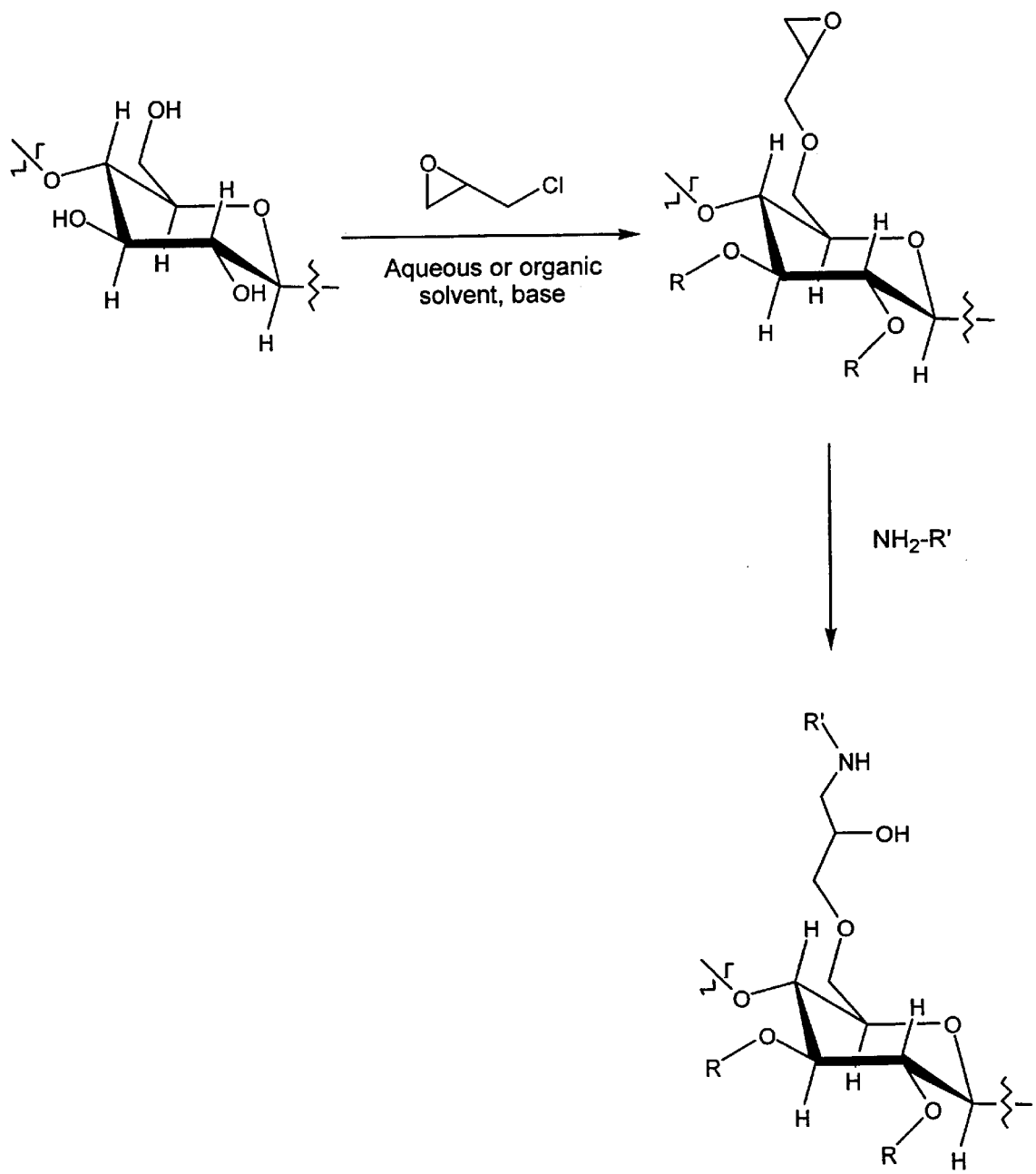
FIG. 6 is a scheme showing the reaction of hydroxyls on a glucose unit of cellulose with epichlorohydrin followed by reaction with an amine.

In another embodiment, modifiable functional groups on materials, such as hydroxyls on one or more glucose units of cellulose can be activated by reaction with epichlorohydrin followed by reaction with an amine, as shown in FIG. 6. Any one or more of the hydroxyls of the glucose unit may react in the reaction. In the possible products shown in FIG. 6, OR is OH or OCH$_2$CHOHCH$_2$NHR'. In FIG. 6, R' is, for example, a hydrophobic group, such as a hydrocarbon or fluorocarbon group.

Other Covalent Modifications

Halogenation

Soil resistant materials, such as cotton and wool fabrics, or any material comprising C—H bonds, can be synthesized in one embodiment through a surface halogenation reaction, such as a fluorination reaction, converting the carbon-hydrogen bonds at the surface to carbon-fluorine bonds. A method of modifying a material, such as a cellulose material is provided, comprising exposing the material to a halogenating agent, such as fluorine gas, in an effective amount to fluorinate at least a portion of the material. This may be accomplished by exposing a surface to 5 to 10% fluorine gas diluted in nitrogen at room temperature for 1 to 15 min. Fluorine can penetrate below the surface to a depth of 30 to 800 Å and this reaction can be performed on a large scale e.g., surface fluorinated polyethylene gloves are made by this process as well as fluorinated polypropylene automobile fuel tanks. H. R. Allcock and F. W. Lampe, *Contemporary Polymer Chemistry,* Prentice Hall, Inc., Englewood Cliffs, N.J., 1990, p. 158.

Crosslinking

Cotton tends to wrinkle and shrink upon washing due to rearrangements of the cellulose chains within the fibers facilitated by water. Cotton is composed of both crystalline and amorphous regions of cellulose. The crystalline regions are very stable and resist wrinkling and shrinking, whereas water can penetrate the amorphous regions and facilitate chain slippage. R. M. Rowell and R. A. Young, Eds., *Modified Cellulosics,* Academic Press, NY, 1978. Therefore, the amorphous regions of cellulose are the source of the undesired properties of cotton. The amorphous regions may be made more rigid, so that the fabric is made both wrinkle and shrink resistant while maintaining the beneficial properties of cotton.

In one embodiment, functionalized glucose molecules, including a glucose molecule comprising a reactive functional group, such as an isothiocyanate, isocyanate, acyl azide, sulfonyl chloride, aldehyde, glyoxal, oxirane, carbonated imidoester, carbodiimide, succinimide ester, epoxide, alkyl halide, anhydride, acid chloride, and activated ester are provided. Exemplary functional groups are disclosed in G. T. Hermanson, *Bioconjugate Techniques,* Academic Press, San Diego, Calif., 1996, pp. 137–165, the disclosure of which is incorporated herein. All of these functional groups are reactive towards the hydroxyls of cellulose. The functionalized glucose molecules are used to crosslink the amorphous regions of the cotton to produce an overall stable fiber resistant to wrinkling and shrinking. Due to the chemically accessible nature of the amorphous region, functionalized glucose can penetrate more, readily into these regions and react to prevent conformational changes. Alternatively, a carbohydrate forming enzyme, such as glycogen synthase, starch synthase, dextran synthase, or cellulose synthase, as described in L. Stryer, *Biochemistry, W. H. Freeman and Co., New York,* 1988, p. 456, the disclosure of which is incorporated herein, can be used to link pure glucose to the cellulose fibers. The advantage of this approach is that the product is almost identical to crystalline cellulose, thus retaining all of the beneficial characteristics of natural cotton while imparting wrinkle and shrink resistance.

Figure 7:
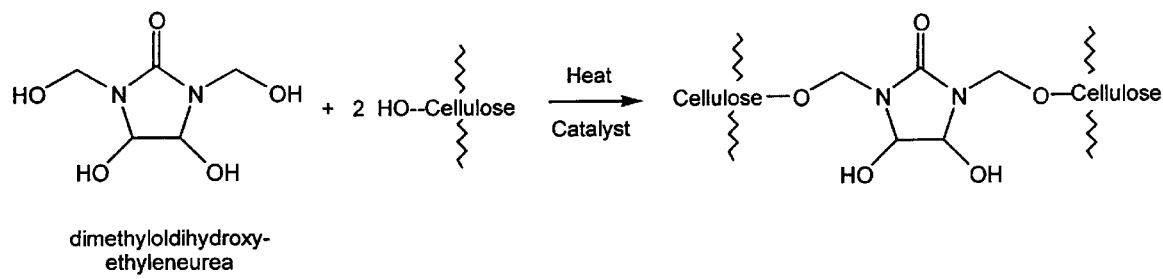
FIG. 7 is scheme showing crosslinking of hydroxyl groups on cellulose with hydrophobically modified dimethyloldihydroxyethyleneurea.
Figure 7:
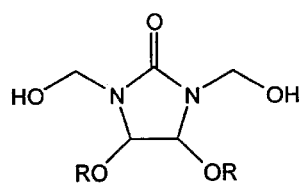

Modifiable functional groups on materials, such as hydroxyl groups on cellulose, also may be crosslinked with hydrophobically modified dimethyloldihydroxyethyleneurea, as shown in FIG. 7, where R is a hydrophobic group, such as a fluorocarbon or a hydrocarbon.

Covalent Attachment of Enzymes

Reduction or elimination of detergents for fabric washing can benefit the environment by reducing this source of water pollution. Soap manufacturers often include enzymes with their surfactants to increase the soil release properties of their detergents. Shimomura et al., *Textile Res. J.*, 67:348–353(1997). During the wash cycle, the enzymes catalytically hydrolyze and release proteinaceous soils adsorbed to the fabric. The disadvantage of this technique is that the enzyme is rinsed away after the wash.

Provided are detergent free wash materials formed by methods wherein enzymes are covalently linked directly to materials such as cellulose materials, such as cotton fabric, thus eliminating the need for use of enzyme in the wash solution and possibly lowering or eliminating the need for detergents. Preferably, the treated garment is simply soaked in water to allow the surface-bound enzymes to hydrolyze and release soils. Methods for the attachment of enzymes to materials described in the art may be used, for example, as described in G. T. Hermanson, *Bioconjugate Techniques*, Academic Press, San Diego, Calif., 1996, pp. 630–639. Additionally, hydrocarbon or fluorocarbon chains may be attached to the fabric to give soil release properties. Exemplary enzymes include trypsin, chymotrypsin and papain.

Applications

Covalent Attachment of Hydrophobic Groups to Impart Water Repellency

Water repellency is imparted by lowering the surface energy of the material, such as cotton fabric, below the surface tension of water, thus causing water to bead on the fabric. The formation of water repellent coatings is particularly useful for the production of water repellent outerwear, such as cotton or wool outerwear. The cotton or wool advantageously retains its breathability, flexibility and softness after modification. The hydrophobically modified material, such as cotton is useful in that it can be made in vibrant and varied colors and patterns, and is light weight, and comfortable. Cotton also is advantageous in that it is natural and inexpensive. Cotton and wool materials may be easily mass produced inexpensively and in a variety of colors, patterns and shades, with good and permanent water repellency.

Water repellent characteristics are imparted on materials, such as cotton-containing materials by chemically linking hydrophobic molecules directly to the material such as cotton fibers. An advantage of this approach over prior coating or laminating processes used for cotton is the use of a natural, inexpensive, and readily available cotton in fiber, yarn or fabric form. This approach may be implemented quickly and cheaply using equipment present in textile mills, such as through a pad dry cure process.

Cotton is composed mainly of the carbohydrate cellulose. It contains many hydrophilic hydroxyl groups imparting it with high wettability. To decrease its wetting properties, these hydroxyls are converted into hydrophobic groups. The attachment of hydrophobic moieties to the cotton is accomplished by covalently attaching a hydrophobic group to the hydroxyl moieties of cotton by methods disclosed herein, such as using an acyl chloride (e.g., palmitoyl chloride) in the presence of a hindered base (e.g., tripentylamine) at room temperature, as described in detail herein. The presence of the hindered base prevents unwanted hydrolysis of the cellulosic material by acids such as HCl produced during the reaction without interfering with the reactivity of the acyl chloride molecule and also catalyzes the reaction of hydroxyl with the acyl chloride. Optionally, a second step is conducted, wherein hydroxyls inaccessible to the larger acyl chloride are capped with a smaller organic acid chloride (e.g., acetyl chloride) in a process referred to herein as backfilling. Monomeric hydrophobic molecules can readily penetrate within the fabric to improve the durability of the coating. Similarly, the methods may be used for other materials including modifiable, functional groups, such as wool.

Covalent Attachment of Hydrophobic Groups to Impart Grease Repellency

Grease repellency properties may be imparted on a material, such as cotton or wool, using methods similar to that for producing water repellent fabric. In, grease repellent materials, the surface energy of the materials must be reduced below that of grease. Typically, grease is a hydrocarbon having a surface tension, similar to that of a hydrocarbon coating. Fluorocarbons are among the lowest surface energy substances known. Bain et al., *J. Am. Chem. Soc.*, 111:7155 (1989). When attached to materials such as fabric, fluorocarbons will sufficiently lower the energy of the fabric to produce grease and water repellency.

Methods disclosed herein for covalent attachment of hydrophobic groups to materials may be used. In one embodiment, a partially fluorinated acid chloride is reacted with a material, such as cotton fabric, in the presence of a hindered base, such as tripentylamine, to produce grease repellent fabric. The cotton further is backfilled with a smaller partially fluorinated acid chloride, such as 2H,2H-trifluoropropanoyl chloride, to achieve maximum repellency. With partially fluorinated compounds, such as dihydro compounds, the problems of completely fluorinated compounds, which do not form durable finishes due to the activation of the surface bond by the fluorine atoms close to the surface resulting in instability to hydrolysis, are avoided.

Increasing the abrasion resistance of fabric can dramatically increase its useful lifetime. Materials, such as cellulose materials, may be coated by covalent attachment of low surface energy monomers or polymers, such as fluorocarbons, and high performance engineered polymers such as nylon and polyamides, to reduce friction, as disclosed herein. This coating thus protects the garment from wear and increases its durability characteristics.

Covalent Attachment of Hydrophobic Groups to Impart Permanent Press Properties

When cotton fabric is immersed in water or heated, the weak forces (hydrogen bonds and van der Waals attractions) that hold the cellulose chains in place break and the chains become free to move. Upon drying or cooling, the chains freeze into whatever position they happen to be in. This physical process is known as wrinkling. Cotton materials may be modified to improve their permanent press properties, with minimal loss of performance properties such as strength and abrasion resistance. Wool can wrinkle in a similar matter.

In one embodiment, materials comprising modifiable functional groups, such as cotton or wool materials are reacted with polymeric acyl chlorides, such as polyethylene acyl chloride or polypropylene acyl chloride, as disclosed herein, to attach hydrophobic groups to the glucose units of the cellulose, or to amino acids in the wool, to endow the modified fabric's surface with a synthetic quality. This type of hybrid fabric can enhance the permanent press character, while retaining many attributes associated with the original natural fibers, such as cotton or wool. The extent of chemical modification will determine the durability of permanent press. Longer reaction times under stronger conditions with activated chemicals will lead to higher degrees of chemical modification, and extent of polymer grafting onto the cotton surface, and thus increased synthetic character.

Other Applications

A variety of materials can be modified as disclosed herein, including various textile fiber materials, in a variety of forms such as fabric, yarn, and thread or as finished articles of apparel or home furnishing fabrics. The modified materials, such as cellulose cotton materials, or cotton containing materials, as well as wool, produced as described herein may be used to form a variety of articles. For example, a variety of clothing items, may be produced using the cellulose cotton materials, including shirts, pants, bathing suits, jackets and shoes. A variety of articles of furniture may be produced including outdoor furniture or furniture coverings. Other items include furniture upholstery, curtains, and bedding items, such as bedsheets or bedspreads, carpets, as well as pillows or pillow coverings, area rugs, throw rugs and mats of various types. Articles for outdoor use may be produced including car upholstery and panels or furniture coverings, air filters such as automobile air filters, tents, umbrellas, land, beach, equipment.

A variety of surfaces can be modified using the methods disclosed herein, to improve their hydrophobicity, including the surface of cellulose containing, materials including cloth and filters. Additionally the surface of paper or wood, including wood furniture, can be treated as disclosed herein.

The invention will be further understood by the following non-limiting examples.

EXAMPLES

Example 1

Blue dyed Levi's™ denim cotton fabric was added at a concentration of 0.1 g/ml to a solution of hexadecanoyl chloride (1M) and tripentylamine (1.5M) in anhydrous ethyl ether. The ether, tripentylamine and hexadecanoyl chloride were obtained from Aldrich Chemical Co., St. Louis Mo. The solution was either inverted or stirred at room temperature overnight. Acetyl chloride, then was added to 0.3 M and reacted for 6 hours. After the reaction was complete, the cotton was rinsed with diethyl ether, and dried.

The covalent attachment of the long chain hydrocarbon imparted is hydrophobic character to the cotton, as evidenced by water beading on the surface, when soaked overnight in a ≧1M solution in ethyl ether.

Example 2

Figure 8:
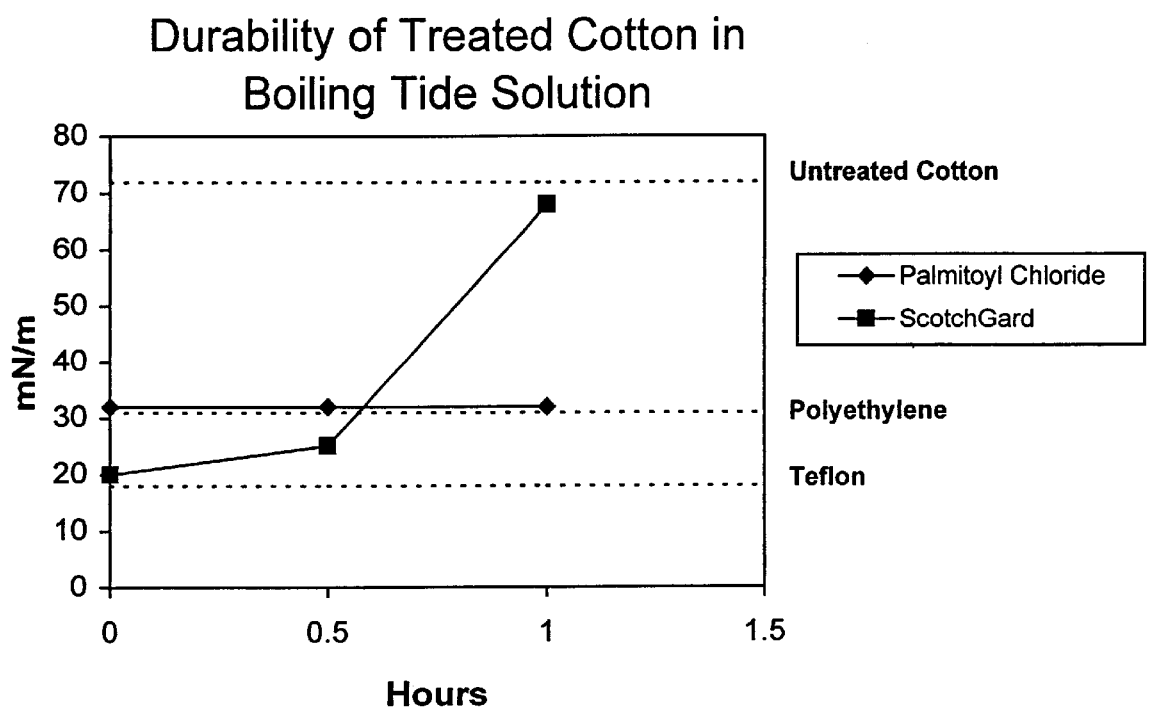
FIG. 8 is a graph comparing the hydrolytic stability of palmitoyl chloride treated cotton and a Scotchgarded® (3M, St. Paul, Minn.) material.

The hydrolytic stability of hydrophobic tails (palmitoyl chloride) grafted through ester bonds on cotton was tested. A cotton swatch (Test Fabrics, West Pittston, Pa.) was treated as described in Example 1. Subsequently, the material was placed in a boiling detergent (Tide) solution (20 g/L) under vigorous agitation. The boiling temperature of the solution was approximately 100° C. Mechanical agitation was implemented using a stirrer with speed set at the highest setting. Additionally, a sample of fluorocarbon treated, Scotchgarded® material was agitated in the boiling detergent solution. The Scotchgarded® material quickly lost all its water repellency under the vigorous washing conditions. In contrast, the palmitoyl chloride treated sample showed robust and persistent water repellency. FIG. 8 is a graph of surface tension vs. time comparing the hydrolytic stability of the palmitoyl chloride treated cotton and a Scotchgarded® material after the boiling detergent treatment.

The surface tension of unmodified cotton was 72 mN/m. The surface tension of cotton treated with pentylamine and palmitoyl chloride was 32 mN/m, and the surface tension of cotton treated with palmitoyl chloride, acetyl chloride and tripentylamine was 30 mN/m. Addition of acetyl chloride slightly improved hydrophobicity of the sample by filling in spaces that the palmitoyl chloride could not access for example due to steric effects.

What is claimed is:

1. A method of modifying a textile material to increase the hydrophobicity of the material, the method comprising crosslinking the material with hydrophobically-modified dimethyloldihydroxyethyleneurea, the hydrophobically-modified dimethyloldihydroxyethyleneurea comprising a covalently attached fluorocarbon group.

2. A method according to claim 1 wherein the textile material is a carbohydrate-containing material.

3. A method according to claim 1 wherein the hydrophobically-modified dimethyloldihydroxyethyleneurea has the following formula, where R is a straight chain, branched or cyclic fluorocarbon:

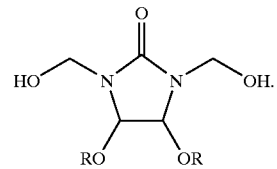

4. A method of modifying a cellulose-containing textile material to increase the hydrophobicity of the material, the method comprising crosslinking hydroxyl groups on the material with hydrophobically modified dimethyloldihydroxyethyleneurea, the hydrophobically modified d imethyloldihydroxyethyleneurea comprising a covalently attached fluorocarbon group.

5. A method according to claim 4 wherein the hydrophobically-modified dimethyloldihydroxyethyleneurea has the following formula, where R is a straight chain, branched or cyclic fluorocarbon:

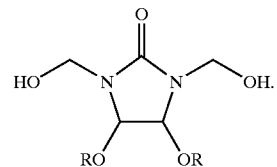

6. A modified carbohydrate-containing textile material produced by reacting the material with hydrophobically-modified dimethyloldihydroxyethyleneurea comprising a covalently attached fluorocarbon group, thereby to crosslink hydroxyl groups on the material with the dimethyloldihydroxyethyleneurea, the modified textile material exhibiting increased hydrophobicity.

7. A modified textile material according to claim 6, wherein the hydrophobically-modified dimethyloldihydroxyethyleneurea has the following formula, where R is a straight chain, branched or cyclic hydrocarbon or a straight chain, branched or cyclic fluorocarbon:

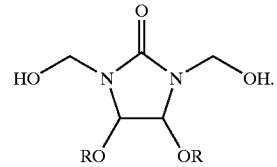

* * * * *